July 6, 1971

J. H. RISEMAN 3,591,481

CONCENTRATION MEASURING SYSTEM

Filed Nov. 12, 1968

JOHN H. RISEMAN
INVENTOR.

BY Robert J. Schiller

ATTORNEY

United States Patent Office

3,591,481
Patented July 6, 1971

3,591,481
CONCENTRATION MEASURING SYSTEM
John H. Riseman, Cambridge, Mass., assignor to Orion Research Incorporated, Cambridge, Mass.
Filed Nov. 12, 1968, Ser. No. 774,953
Int. Cl. G01n 27/46
U.S. Cl. 204—195                      7 Claims

ABSTRACT OF THE DISCLOSURE

A system for measuring the concentration of species of ions in a sample solution with a potentiometric electrode having a Nernstian response. The electrode and a reference electrode are connected to a meter which can be nulled at a central indicium on the meter scale. The meter scale is divided to one side of the null indicium into increments over a range from a first minimum value to infinity at the null point according to the function $$\log\left(\frac{C+Q}{C}\right)$$

Figure 1:
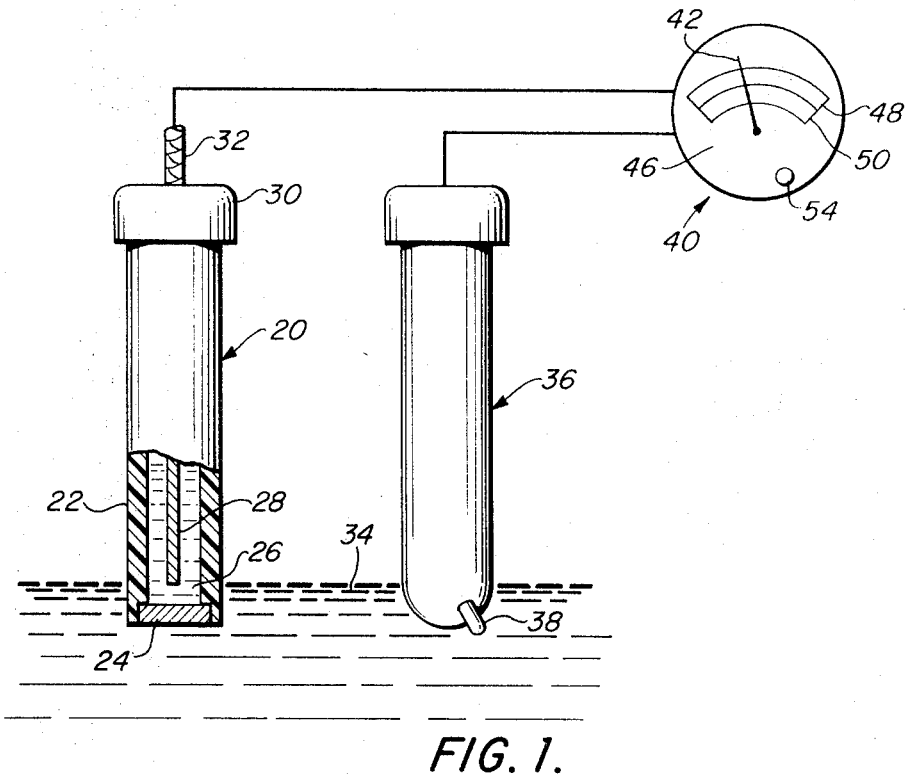

where C is the concentration of the species in the sample solution and Q is the fixed molarity of the species of ion of interest in a standard solution. The scale is divided to the other side of the null indicium in a similar manner but according to the function $$\log\left(\frac{C}{C-Q}\right)$$

Insertion of the electrodes into the sample solution provides a response which is nulled at the meter. The addition of the standard solution creates a new potential which when read on the appropriate scale, indicates the concentration of the species of ion to which the potentiometric electrode is responsive.

---

This invention relates to electrochemical detection and measurement, and more particularly to novel means for measuring the concentration of specific ions in solution.

Presently, determination of the presence of many ions such as $Ag^+$, $F^-$, $Cl^-$, $Ca^{+++}$ and the like can be made by use of commercially available potentiometric electrochemical electrodes. Such electrodes yield a continuous-signal output voltage having a simple logarithmic relation to ion activity, with sufficiently fast response to permit readings to be made substantially in real time. This logarithmic relation is the well-known Nernst equation (1) $$E = K + \frac{RT}{nF} \log A$$

where E is the observed potential, K is a constant, R is the gas constant, T is the absolute temperature, F is the value of a Faraday, $n$ is a positive integer selected according to the valence change of the ion of interest, and A is the ionic activity. The last term of this equation is positive, as shown, for cations and negative for anions.

However, the voltage observed is not necessarily simply related to concentration for a number of reasons. First, the activity of a given ion in a solution is affected by the background activity of other ions, i.e., the total ionic strength of the solution. As the strength of the latter increases, generally one can expect that the activity of a given ion apparently decreases. Also, often ions are complexed and in such case, the measured activity differs markedly from the concentration. For example, $F^-$ is complexed by $Mg^{++}$ to form $MgF^+$. An electrode sensitive to fluoride ion activity therefore simply does not accurately measure the fluoride concentration, for example in sea water, where there is an excess of magnesium ion present.

It is desirable in many instances to know the concentration of a species of ions in solution rather than its activity. For example, the quantity of material allowable in a system is often specified in parts per million of total concentration, and as noted, it is sometimes difficult or even impossible to monitor or to make an accurate quantitative determination of concentration in such a system with a potentiometric electrode system that only indicates ionic activity. While such systems have been calibrated to read out the voltage in terms of concentration, these systems are useful for measurements strictly limited to solutions with a relatively fixed ionic strength and that calibration is valid for only one species of ion of interest. In case the ionic strength varies or one wishes to use the system to measure another species of ion, then the system must be recalibrated, an often lengthy, tedious procedure.

Accordingly, the present invention contemplates an improved system for detecting and quantitatively measuring the concentration of ions in solution. Another object is to provide, for use with conventional potentiometric electrochemical electrodes and means for reading out the potential of the latter, novel means for relating the potential developed by such electrodes to a direct measurement of the concentration in the solution of the ions to which such electrode is responsive. Still another and more specific object is to provide, for use with a conventional potentiometric electrochemical electrode and high-impedance voltmeter, a meter face having a scale divided into a number of logarithmic decades, which scale provides indicia relating the concentration of any species of ions in solution to the input voltage delivered to the voltmeter by an electrode having a Nernstian response to such species.

Yet other objects of the invention will in part be obvious and will in part appear hereinafter. The invention accordingly comprises the apparatus possessing the construction, combination of elements, and arrangement of parts, and comprises the several steps and the relation of one or more of such steps with respect to each of the others, all of which are exemplified in the following detailed disclosure, and the scope of the application of which will be indicated in the claims.

Generally to achieve the foregoing and other objects, the present invention comprehends a system including at least one potentiometric electrochemical electrode exhibiting a substantially Nernstian response and an electrometer or voltmeter which has an element deflectable, preferably linearly, with respect to the potential of the electrode when responding to ions to which the electrode is sensitive. The meter is provided with a novel scale arranged to indicate a reading of the ion concentration in the solution.

Measurements are effected by relating the electrode potential resulting from an unknown or sample solution with the electrode potential from a mixture of that sample solution with a standard solution of known concentration of the ion of interest or a strong complexing or precipitating agent for the ion of interest. The method of obtaining a measurement requires two steps. First, the electrode sensitive to the ion of interest is immersed into a specific volume (e.g., 50 ml.) of the sample solution containing an unknown amount of the ion of interest; the potential developed then causes a deflection of a meter movement in accordance with the Nernst equation. The meter movement is then adjusted to a null point and a small known volume (e.g., 1 ml.) of a standard solution containing a known concentration of the ion of interest is added to the sample. The addition of the standard solution will change the total so that a new potential will arise which causes the meter movement to deflect away from the null point by some value, $\Delta E$. Since the concentration of the standard solution is predetermined, the concentration of the sample will appear as a reading on the meter scale or base expressed typically in moles per liter based on the value of $\Delta E$ as will be explained hereinafter.

For a fuller understanding of the nature and objects of the present invention, reference should be had to the following detailed description taken in connection with the accompanying drawing wherein.

Figure 2:
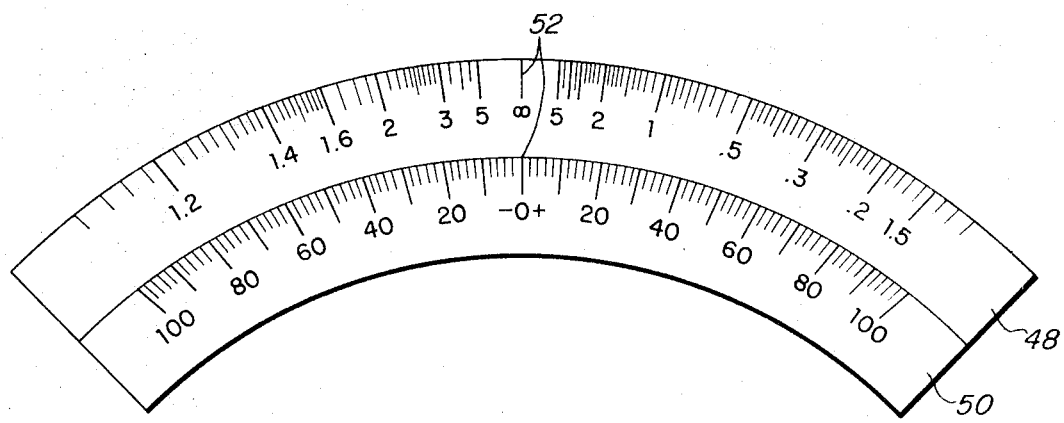

FIG. 1 is a schematic, side-elevational, partly sectional view of a system, including exemplary electrochemical electrodes and voltmeter, for detecting ions in solution and FIG. 2 is a plan view of a meter face embodying the principles of the present invention, for use with the apparatus of FIG. 1.

Referring now to the drawing, there is shown in FIG. 1 an exemplary electrochemical electrode 20 comprising a hollow, tubular sleeve 22 open at both ends and formed of an electrically insulating material which is relatively chemically inert to solutions being tested and with which the sleeve might be placed in contact. One end of sleeve 22 is capped or sealed with an ion-sensitive element such as membrane 24 formed of or containing a substance substantially responsive to the ion to be measured. Such membranes, well-known in the art, can be of so-called pH glass; can be an inert, porous substrate filled with a liquid ion-exchange material; can be a crystalline material such as AgCl and the like; an dcan be of many other materials known in the art.

Disposed internally of sleeve 22 and in electrical and physical contact with the inner surface of membrane 24 is the usual charge transfer means providing a fixed concentration of an electrically conductive material, solid or liquid, ionic or metallic, as the case may be, form. Such transfer means typically is shown as a liquid reference electrolyte 26. Immersed in electrolyte 26 is internal reference electrode 28, for example the well-known Ag-AgCl element. This combination of electrolyte 26 and reference electrode 28 provides means for electrically contacting the internal surface of the membrane (i.e., the surface which contacts electrolyte 26) at a substantially stable or fixed potential. As shown, the opposite end of sleeve 22 is fitted with an annular cap 30 having an aperture in which is sealed the usual coaxial cable 32, the central conductor of which is connected to reference electrode 28 and the peripheral conductor of which provides electrostatic shielding.

In use, at least membrane 24 of electrode 20 is placed in contact with or immersed within a predetermined volume of the sample solution 34 (at some standard temperature such as 25° C.) which contains the ion sought to be measured.

A standard reference electrode 36 is also placed in contact with sample solution 34. Typically, electrode 36 is the usual assembly housed in a conventional glass shell containing an Ag-AgCl electrode in saturated KCl-AgCl, separated by an asbestos fiber junction from a 1 M NaOH solution. The latter solution occupies the lower end of the shell and is coupled to solution 34 through the usual fiber junction shown at 38. Reference electrodes of this type and others are so well-known in the art as to require no further description here. Both electrode 20 and electrode 36 are connected electrically to respective inputs of an electrometric device, preferably the usual high-input impedance voltmeter 40.

Voltmeter 40 includes means for displaying the meter response to an input signal. In the preferred form this means includes a deflectable meter movement, (not shown) for example of the d'Arsonval type which will deflect angularly in substantially linear relationship to the input signal. Connected to the movement is the usual indicator needle 42. Adjacent the latter is meter face 46 having thereon at least one scale indicated at 48, and preferably another scale 50 parallel to scale 48. Both scales have a central or null indicium 52 corresponding to same position of needle 42 intermediate the extremes of the range of the displacement of the meter movement. Known means, indicated only by a manually engageable control knob 54, are included in meter 40 for nulling the meter movement, i.e., for positioning the movement so that for an arbitrary steady-state voltage within the range of the voltmeter, needle 42 can be disposed at "rest" position corresponding to indicium 52.

Scale 50 is quite similar to known scales in that it simply is a scale starting at a zero coincident with indicium 52 and proceeding in linear increments in opposite directions, one of which is positive, the other negative. Associated with selected increments of scale 50 are the usual numerical values indicating increasing magnitude in both directions to maximum values from zero. Preferably these values are for increments of angular deflection in terms of the millivolts of the input signal. Such a scale is quite typical of a number of null meters.

On the other hand, scale 48 also includes positive and negative portions both starting at zero, but this scale is quite unique. In one direction the increments are logarithmic and are spaced substantially in accordance with the function.

(2) $$\log\left(\frac{C+Q}{C}\right) \text{ or } \log\left(\frac{C}{C+Q}\right)$$

where Q is some arbitrarily chosen constant and C can vary from magnitudes much greater than Q to magnitudes much less than Q.

In the other direction, the increments are also logarithmic and are spaced substantially according to the function (3) $$\log\left(\frac{C}{C-Q}\right) \text{ or } \log\left(\frac{C-Q}{C}\right)$$

It will be apparent here that if Q is the same constant as in function (2) and C is same magnitude greater than Q, as C approaches Q, the ratio, of course, approaches infinity. The functions set forth in (2) above are mathematically equivalent except for signs, as are the two functions set forth in (3).

In both functions (2) and (3), C in fact is the concentration of the species of ion of interest in the sample solution and Q is the concentration of that species in the standard solution (or, more broadly, the concentration of some species that when added to the sample solution will affect the concentration C). Associated therefore with selected incremental indicia on scale 48 are numerical values of C, for example in moles/liter, for an arbitrarily chosen fixed ratio of volumes of sample to standard solution and for an arbitrarily fixed molarity of the free ions of interest in the standard solution. Scale 48 has been shown as a center null meter with ranges of values extending in opposite directions from a null point, but it will be appreciated that the null point for both ranges can be at one end of the meter scale with both ranges being in the same direction. In such case, a range selection switch would be desirable to ensure the proper scale was being used.

In operation, when electrodes 20 and 36 are contacted by solution 34 initially, reference potentials of substantially fixed values will exist between the solution and electrode 36 and the internal reference electrode 28 and electrolyte 26. Substantially, the only variable potential in the system is that arising across membrane 24, and this voltage will vary according to the Nernst equation. Hence, the activity of the sample solution is measured in terms of $E_t$, the potenial across membrane 24.

Now having determined $E_t$ for the predetermined volume of solution 34, one adds a specific small volume of a standard solution of known concentration to the sample solution. If the ionic strength of the sample solution is relatively high and one adds a standard solution in which the concentration of the ion of interest is within, for example a few order of magnitude of that of the ion of interest in the sample solution, the ionic strength of the latter will not change significantly, but the ionic activity of the ion of interest will be affected and the change can be determined readily by electrode 20. On the other hand, if the ionic strength of the sample solution is relatively low, the addition of the same reference solution might markedly change the total ionic strength but at those low levels of ionic strength, the activity coefficient of the ion of interest does not change much with changes in ionic strength. Hence the change in ionic activity of the ion of interest as determined by electrode 20 will remain about the same as that seen in the sample solution of much higher total ionic strength.

The addition of the reference solution will usually effect a change $\Delta E$ in the potential read by the voltmeter. If the standard solution contains the ions of interest to which the potentiometric electrode is responsive, then the net activity determined by the electrode will increase; this technique is termed "standard addition." If the standard solution contains material which removes ions of interest from the sample solution, the ion activity seen by the electrode decreases. This removal of ions can occur by complexing, precipitation and the like, and is termed "standard subtraction."

However, as previously noted, the concentration is not necessarily the same as the ionic activity. In this respect, the two can be equated through same factor $\gamma$ as follows:

(4) $$\gamma C = A$$

where C is concentration, A is ionic activity and $\gamma$ is a coefficient which, inter alia, depends on the fraction that ionic species of interest represents in the total ionic population, and on the fraction of that ionic species present as the free ions. Now substituting the above Equation 4 in the Nernst equation, we find that (5) $$E = K + \frac{RT}{nF} \log \gamma C$$

If we consider E to be the potential determined from the original sample solution alone, then assuming that the volume change upon addition of the standard solution can be ignored, the new potential $E_N$ can be expressed as (6) $$E_N = K + \frac{RT}{nF} \log (\gamma C + \gamma Q)$$

where Q is the known concentration of the ion of interest in the standard solution. The use of the coefficient $\gamma$ with both C and Q implies that the ionic strength of the solution does not materially change with the addition of the reference solution, and that any complexing agent present is in a large excess relative to the amount of the ion of interest added with the reference solution. These restraints can readily be met by selecting the relative volumes of the solutions, preferably by using small volumes of standard solution to large volumes of the sample solution, e.g. 1/50. Now if the meter movement is nulled so that the original E is set at zero, then (7) $$E_N - E = \Delta E$$

where $\Delta E$ is the change in the meter deflection from its null point. Subtracting Equation 5 from Equation 6 then provides (8) $$\Delta E = \frac{RT}{nF} \log \left( \frac{\gamma C + \gamma Q}{\gamma C} \right)$$

or (9) $$\Delta E = \frac{RT}{nF} \log \left( \frac{C + Q}{C} \right)$$

Because we can readily measure $\Delta E$, $RT/nF$ is known to be approximately 60 mv. for monovalent ions at 29° C., and Q is also known, C can readily be computed.

Accordingly, scale 48 shown in FIG. 2 is computed for various values of $\Delta E$ for a predetermined ratio of standard solution volume to sample volume (e.g., typically 1 ml./50 ml.). It will be appreciated that the scale indicia are representative then of C or the concentration in moles/liter of the ion of interest in the sample solution.

Scale 48 can be experimentally calibrated by using a sample solution of 50 ml. of 1 M $AgNO_3$ with an electrode 20 sensitive to silver ion (typically, an Ag-AgCl electrode). The latter is placed in the solution, the potential developed allowed to reach an equilibrium value and the meter nulled. Then a standard solution of, for example, 1 ml. of 1 M AgNO, is added. The new potential is allowed again to reach equilibrium and the deflection of the meter noted and marked 1. The electrode is then washed and placed into a sample solution of 50 ml. of 0.1 M $AgNO_3$, the reading nulled, another volume of standard solution added and the new deflection noted and marked 0.1. In similar fashion, using a number of 50 ml. sample solutions of various known concentration with 1 ml. standard solutions all of the same molarity, one can calibrate the scale with values at least in one direction from the null point.

Calibration in the opposite direction can easily be achieved using "standard subtraction" techniques. In such case, the same steps as previously are performed using however a 1 ml. standard solution, for example of NaCl, of known and constant concentration which will always reduce the concentration of the species of ion of interest in the sample solution by a known amount. In this instance, the value $\gamma Q$ is subtracted rather than added in Equation 6, hence it can be shown that

(10) $$E = \frac{RT}{nF} \log \left( \frac{C}{C - Q} \right)$$

It is clear that functions (2) and (3) are derived from Equations 9 and 10. Comparing the two latter equations, it will be seen that where Q is constant and C increases, the logarithmic terms both approach unity, the log of which is zero. Where the ratio is as set out in Equation 9, with Q kept constant and C decreasing, the ratio approaches infinity. Where the ratio involves the difference between C and Q, it will be apparent that Q cannot exceed C and as C approaches the value of Q so that the difference becomes vanishingly small, the ratio also approaches infinity.

Meter deflections are then logarithmically proportionate in the positive or negative direction as the case may be. It will be appreciated that the two functions being different, of necessity, the magnitude of the logarithmic increments correspondingly differ in each direction.

It will be understood that while the actual values placed on the scale are arbitrary in a sense, the relationship of the scale in the positive direction to the scale in the negative direction is determined by the two general functions involved. Thus, the calibration in quantitative terms requires that the instrument after calibration be used with a standard solution of the preselected molarity on which the calibration is based and also on the preselected ratio of sample to reference volumes. However, it need not be again calibrated in the usual sense. The calibration can of course be done without sample solutions simply by applying fixed increments of voltage to the instrument and marking the equilibrium position with the value of the concentration in moles/liter calculated from either Equation 9 or 10 for a potential of that value. The observed response verifies that the calculated response accords very well in actual testing.

Since certain changes can be made in the above apparatus and method without departing from the scope of the invention herein involved, it is intended that all matter contained in the above description or shown in the accompanying drawing shall be interpreted in an illustrative and not in a limiting sense.

What is claimed is:

1. For use with a potentiometric electrode having a substantially Nernstian response to the activity of a species of ion in a sample solution, and a predetermined quantity of a standard solution having a fixed molarity Q of a the response from said sample solution when mixed with said sample solution, the volumes of said standard solution to said sample solution being arbitrarily fixed, electrometric means responsive to said Nernstian response and comprising means for displaying the responsiveness of said electrometric means over at least one range of values from a minimum value, said range being divided into increments spaced from said value substantially according to a function in the form $$\log \frac{X}{Y}$$

where $X$ is either $C$, $(C+Q)$ or $(C-Q)$ and $Y$ is either $(C+Q)$ or $(C-Q)$ when $X$ is $C$, or $Y$ is $C$ when $X$ is either $(C+Q)$ or $(C-Q)$, where $C$ is the concentration of the species of ion in said sample solution.

2. Electrometric means as defined in claim 1 wherein said function is substantially either $$\log \left(\frac{C+Q}{C}\right) \text{ or } \log \left(\frac{C}{C+Q}\right)$$

3. Electrometric means as defined in claim 2 including means for displaying said responsiveness over another range of values from a second minimum value, said another range being divided into increments spaced from said second value according to the function $$\log \left(\frac{C}{C-Q}\right)$$

and located along a path of relative motion of said element and said face from said first mentioned minimum value in one direction, said scale face also includes indicia corresponding to a second range of values divided according to the functions $$\log \left(\frac{C-Q}{C}\right) \text{ or } \log \left(\frac{C}{C-Q}\right)$$

and located along said path from a second minimum value in the opposite direction, and wherein said electrometric means includes means for adjusting the relative positions of said indicator element and scale face so that said element can be substantially registered at a null point for a steady-state condition of said movement, said null point being located intermediate said first mentioned minimum value and said second minimum value and at a common point indicating a substantially infinite value for the absolute value of all of said functions.

6. Electrometric means as defined in claim 5 including another series of indicia dividing said scale in increments of equal size over a range of directions from said null point in a first direction parallel with said first mentioned